(12) United States Patent
Wang et al.

(10) Patent No.: US 6,608,409 B2
(45) Date of Patent: Aug. 19, 2003

(54) HIGH TEMPERATURE SUPER-CONDUCTING ROTOR HAVING A VACUUM VESSEL AND ELECTROMAGNETIC SHIELD AND AN ASSEMBLY METHOD

(75) Inventors: Yu Wang, Clifton Park, NY (US); Konrad Roman Weeber, Rexford, NY (US); Kiruba Sivasubramaniam, Troy, NY (US); Robert John Nygard, Saratoga Springs, NY (US); Xianrui Huang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 09/854,937

(22) Filed: May 15, 2001

(65) Prior Publication Data

US 2002/0171319 A1 Nov. 21, 2002

(51) Int. Cl.[7] .................................................. H02K 9/00
(52) U.S. Cl. ............................................ 310/54; 310/64
(58) Field of Search ........................... 310/52, 54, 57, 310/58, 59, 61, 64, 65

(56) References Cited

U.S. PATENT DOCUMENTS

| | | | |
|---|---|---|---|
| 4,291,997 A | * | 9/1981 | Laskaris ..................... 403/24 |
| 4,554,731 A | * | 11/1985 | Borden ....................... 29/605 |
| 4,820,945 A | * | 4/1989 | Khutoretsky et al. ......... 310/52 |
| 5,532,663 A | | 7/1996 | Herd et al. .................. 335/216 |
| 5,548,168 A | | 8/1996 | Laskaris et al. ............... 310/52 |
| 5,672,921 A | | 9/1997 | Herd et al. .................... 310/52 |
| 5,774,032 A | | 6/1998 | Herd et al. .................. 335/216 |
| 5,777,420 A | | 7/1998 | Gamble et al. .............. 310/261 |
| 5,798,678 A | | 8/1998 | Manlief et al. .............. 335/216 |
| 5,880,547 A | * | 3/1999 | Shoykhet ...................... 310/91 |
| 5,953,224 A | | 9/1999 | Gold et al. .................... 363/98 |
| 6,066,906 A | | 5/2000 | Kalsi .......................... 310/179 |
| 6,140,719 A | | 10/2000 | Kalsi ........................... 310/52 |
| 6,169,353 B1 | | 1/2001 | Driscoll et al. ............. 310/261 |
| 6,173,577 B1 | | 1/2001 | Gold .......................... 62/51.1 |
| 2002/0125787 A1 | | 9/2002 | Howard et al. ............. 310/254 |
| 2003/0011253 A1 | | 1/2003 | Kalsi et al. ................... 310/58 |
| 2003/0011273 A1 | | 1/2003 | Kalsi et al. ................. 310/261 |
| 2003/0011452 A1 | | 1/2003 | Snitchler et al. ............ 335/216 |

OTHER PUBLICATIONS

Fast, Reactive Power Support, *HTS Generators*, American Superconductor™ (Feb. 27, 2001)pp. 1–4.

* cited by examiner

*Primary Examiner*—Dang Dinh Le
(74) *Attorney, Agent, or Firm*—Nixon & Vanderhye, P.C.

(57) ABSTRACT

A rotor is disclosed for a super-conducting synchronous machine having: a rotor core; a super-conducting coil extending around at least a portion of the rotor core, the coil having coil side sections on opposite sides of the rotor core; a vacuum housing covering at least one of the coil side sections, and a conductive shield over the vacuum housing and coil side sections.

23 Claims, 9 Drawing Sheets

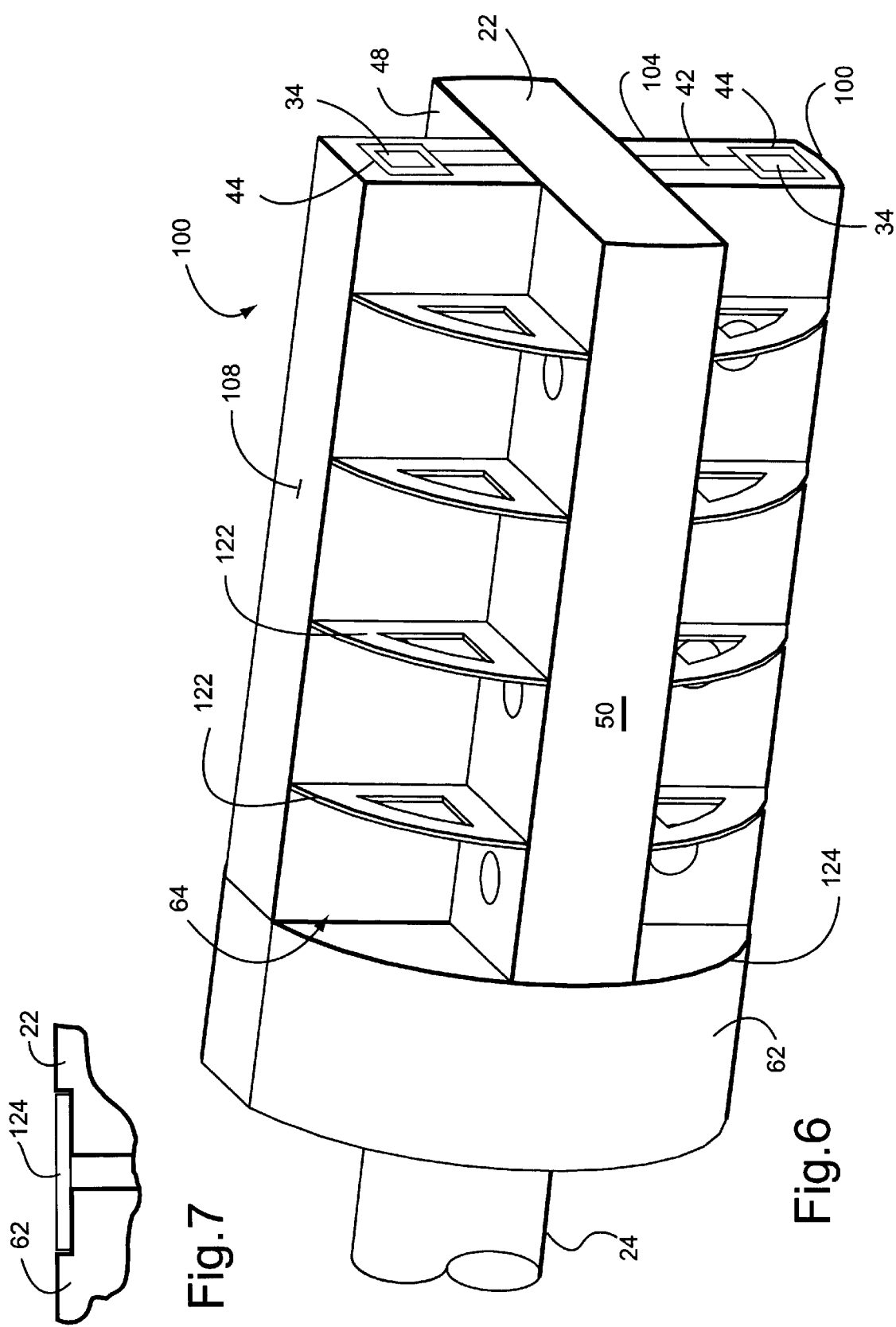

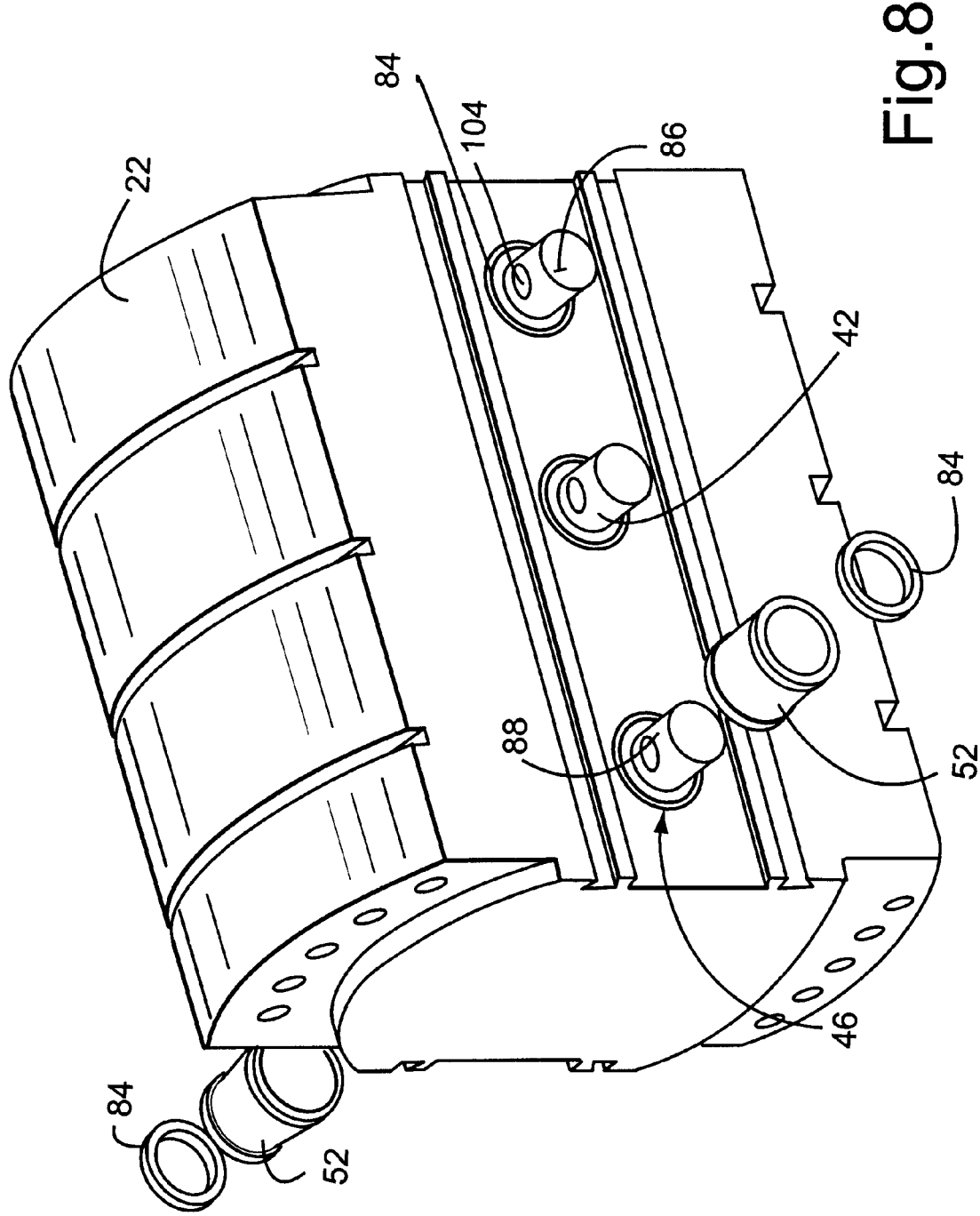

HIGH TEMPERATURE SUPER-CONDUCTING ROTOR HAVING A VACUUM VESSEL AND ELECTROMAGNETIC SHIELD AND AN ASSEMBLY METHOD

RELATED APPLICATIONS

This application is related to the following commonly-owned and commonly-filed applications (the specifications and drawings of each are incorporated herein):

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conductive rotor in a synchronous rotating machine. More particularly, the present invention relates to an electromagnetic shield and vacuum vessel for super-conducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core, and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC (HTS) coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have been cooled to cryogenic temperatures, such as by liquid helium. After passing through the windings of the rotor, the warmed, used helium is returned as gaseous helium. Using liquid helium for cryogenic cooling requires continuous reliquefaction of the returned, room-temperature gaseous helium, and such reliquefaction poses significant reliability problems and requires significant auxiliary power.

In addition, HTS coils are sensitive to degradation from high bending and tensile strains. These coils must undergo substantial centrifugal forces that stress and strain the coil windings. Normal operation of electrical machines involves thousands of start up and shut down cycles over the course of several years that result in low cycle fatigue loading of the rotor. Furthermore, the HTS rotor winding should be capable of withstanding 25% over-speed operation during rotor balancing procedures at ambient temperature and notwithstanding operational over-speed conditions at cryogenic temperatures during power generation operation. These over-speed conditions substantially increase the centrifugal force loading on the windings over normal operating conditions.

SC coils generally must be thermally insulated by a vacuum to yield super-conducting characteristics. The vacuum prevents heat from the warm rotor core from being transferred by convection to the SC coils. The SC field coil has to be completely enclosed by vacuum. The vacuum requires that a vacuum vessel and associated air-tight seals be maintained on the rotor.

SC coils used as the HTS rotor field winding of an electrical machine are subjected to stresses and strains during cool-down and normal operation. They are subjected to centrifugal loading, torque transmission, and transient fault conditions. To withstand the forces, stresses, strains and cyclical loading, the SC coils should be properly supported in the rotor by a coil support system and shielded against dynamic and transient magnetic fields. These support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing shields and coil support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. The need also exists for a coil support system made with low cost and easy to fabricate components.

SUMMARY OF THE INVENTION

Structural supports for the HTS field coil windings have been one of the primary challenges to incorporating SC coils into rotors. The structure must support the SC coil winding without conducting substantial heat into the winding. In the disclosed novel concepts the structure of the coil support has been minimized so as to reduce the mass that conducts heat from the rotor core into the cooled SC windings. However, minimizing the coil supports also limits the level of forces that can be withstood by the supports. If the forces that act on the rotor exceed the force carrying ability of the coil supports, then there is a substantial risk that the coil support will fail or that the coil windings will be damaged.

A potential source of forces that act on a rotor is torque due to grid faults. A high temperature super-conducting (HTS) generator having a field winding SC coil is susceptible to electrical grid faults. A grid fault is a current spike in the power system grid to which is coupled the stator of the machine. Under grid fault conditions, excessive current flows in the stator. This current causes an electrical disturbance in the stator winding that induces a strong magnetic flux that can penetrate into the rotor field winding coils.

The potential penetration of a magnetic field into the rotor field winding coil creates significant torque on the rotor coil winding. This torque can damage a SC coil and a weak coil support structure. In addition to this mechanical effect, magnetic field penetrations of the rotor can cause alternating current (AC) losses in the rotor structure, especially in the HTS wire. It would be advantageous to minimize the penetration of the rotor by grid fault induced and other magnetic fields. Reducing the rotor torque due to grid faults allows the coil support structures to be minimized. Minimizing magnetic field penetrations of the rotor should also reduce AC current losses in the HTS rotor.

Shielding the rotor prevents stator alternating and time-varying magnetic fields from penetrating the rotor. If a rotor field winding coil is not well shielded, the magnetic flux from the stator penetrates the rotor and causes torque in the magnetic rotor and SC coil. Such torques may damage a brittle SC coil, even though such stator flux induced torque has not generally damaged prior ductile copper rotor coils. If a rotor having SC coils is not properly shielded, then coil support must be reinforced to withstand fault-induced torque. However, a drawback of reinforcing the coil support is that it also increases the mass of the support, and leads to potential problems with increased heat transfer to the cold SC coil.

Instead of increasing the mass of the coil support, it is preferable to have an electromagnetic (EM) shield that prevents alternating magnetic flux from penetrating the rotor and inducing torque on the SC coils. Cylindrical EM shields and vacuum vessels that cover the entire rotor core are difficult to fabricate for large SC machines because of their size. Forming a large cylinder of copper or aluminum to tight tolerances is another difficulty with making a cylindrical EM shield and vacuum vessel. If the EM shield and vacuum vessel are cylinders that slide one over the other, then both cylinders would preferably be joined to maintain a vacuum and prevent alternating flux from entering the rotor. Joining dissimilar metals, such as a stainless steel vacuum vessel and an EM shield formed of copper or aluminum, is difficult. The difficulty with combined cylindrical EM shields and vacuum vessels are pronounced for large machines due to their physical size. However, cylindrical EM shields and vessels may be suitable for smaller machines that have rotors sufficiently small that EM cylinders and cylindrical vacuum vessels may be relatively easily fabricated.

For large machines, it is a substantial challenge to manufacture, assemble and balance a large and continuous piece of cylindrical shield with the required precision and tolerances needed for an EM shield or vacuum vessel. If the cylindrical electromagnetic shield enclosure is also used as a vacuum boundary, then the rotor body may be covered by the vacuum vessel. Thus, the surface of the rotor is generally inaccessible and cannot be accessed to properly balance the rotor.

Balancing the rotor generally involves adding balancing weights to the rotor body at various locations along its full axial length and around the perimeter, and for these reasons requires access to the complete surface of the rotor body. If the vacuum vessel covers the entire forging, then the rotor must be balanced before the vessel is applied to the rotor. However, pre-balancing the rotor before the assembly of the vacuum vessel and EM shield increases production cycle time and process cost. Moreover, pre-balancing the rotor occurs at ambient temperatures, but the rotor operates at cryogenic temperatures. The balance of the rotor may be affected by the cold conditions required for the SC winding. Thus, it is preferable to balance the rotor under cold cryogenic conditions.

A novel EM shield and vacuum vessel concept has been developed for use with a large super-conducting machine, such as a motor or generator. The machine includes a rotor having an iron core and a super-conducting rotor field winding coil. The coil is insulated by a vacuum formed by a vacuum channel housing that fits over the coil. The vacuum channel does not cover the entire surface of the rotor core. Thus, the rotor may be accessed during cold rotor balancing operations.

The SC coil is also protected by an electromagnetic shield. The shield is separate from the vacuum vessel. The EM shield prevents the penetration of alternating or time-varying magnetic flux into the rotor. These magnetic fields are generated by transients, such as sudden short circuits or grid faults, and by negative sequence fields due to machine load imbalances. In addition, the EM shield dampens the harmonic fields generated by stator magnetomotive force space and time harmonics.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system is preferably integrated with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

In a first embodiment, the invention is a rotor for a synchronous machine comprising: a rotor core; a super-conducting coil extending around at least a portion of the rotor core, the coil having coil side sections on opposite sides of the rotor core; a vacuum housing covering at least one of the coil side sections, and a conductive shield over the vacuum housing and coil side sections.

In another embodiment, the invention is a method for providing a vacuum around a super-conducting coil winding on a rotor core of a synchronous machine comprising the steps of: assembling the coil winding and rotor core; attaching end shafts coaxially to the core; straddling a vacuum housing over a side section of the coil winding and sealing the housing to the rotor core, and sealing the vacuum housing to the end shafts to form a vacuum region around the coil winding.

Another embodiment of the invention is a rotor comprising: a rotor core having an axis; a pair of end shafts extending axially from opposite ends of the core, wherein the end shafts each have a slot adjacent the core end; a super-conducting rotor coil having coil side sections parallel to the core axis and adjacent opposite sides of the core, and the coil having coil end sections transverse to the core axis and adjacent to the ends of the core, wherein the coil end sections each extend through one of the slots in the end shafts; a vacuum housing over each the coil side sections and having ends each being sealed to one of slots, and a vacuum region around the coil defined by the slot in the pair of end shafts and the vacuum housing over each of the coil side sections.

A further embodiment of the invention is a rotor comprising: a rotor core having an axis; an end shaft extending axially from an end of the core, wherein the end shaft has a slot adjacent the core end; a super-conducting rotor coil having at least one coil side parallel to the core axis and at least one coil end transverse to the core axis, wherein the coil end extends through the slot in the end shaft; a vacuum housing over the coil side and seal with the slot to define a vacuum region around the coil.

DESCRIPTION OF THE DRAWINGS

The accompanying drawings in conjunction with the text of this specification describe an embodiment of the invention.

FIG. 6 is a schematic perspective view of a rotor with a vacuum channel.

FIG. 7 is an enlarged schematic view of a seal between a rotor core and end shaft collar.

FIGS. 8 to 11 are perspective views showing the assembly process for the HTS rotor shown in FIG. 3.

DETAILED DESCRIPTION OF THE INVENTION

Figure 1:
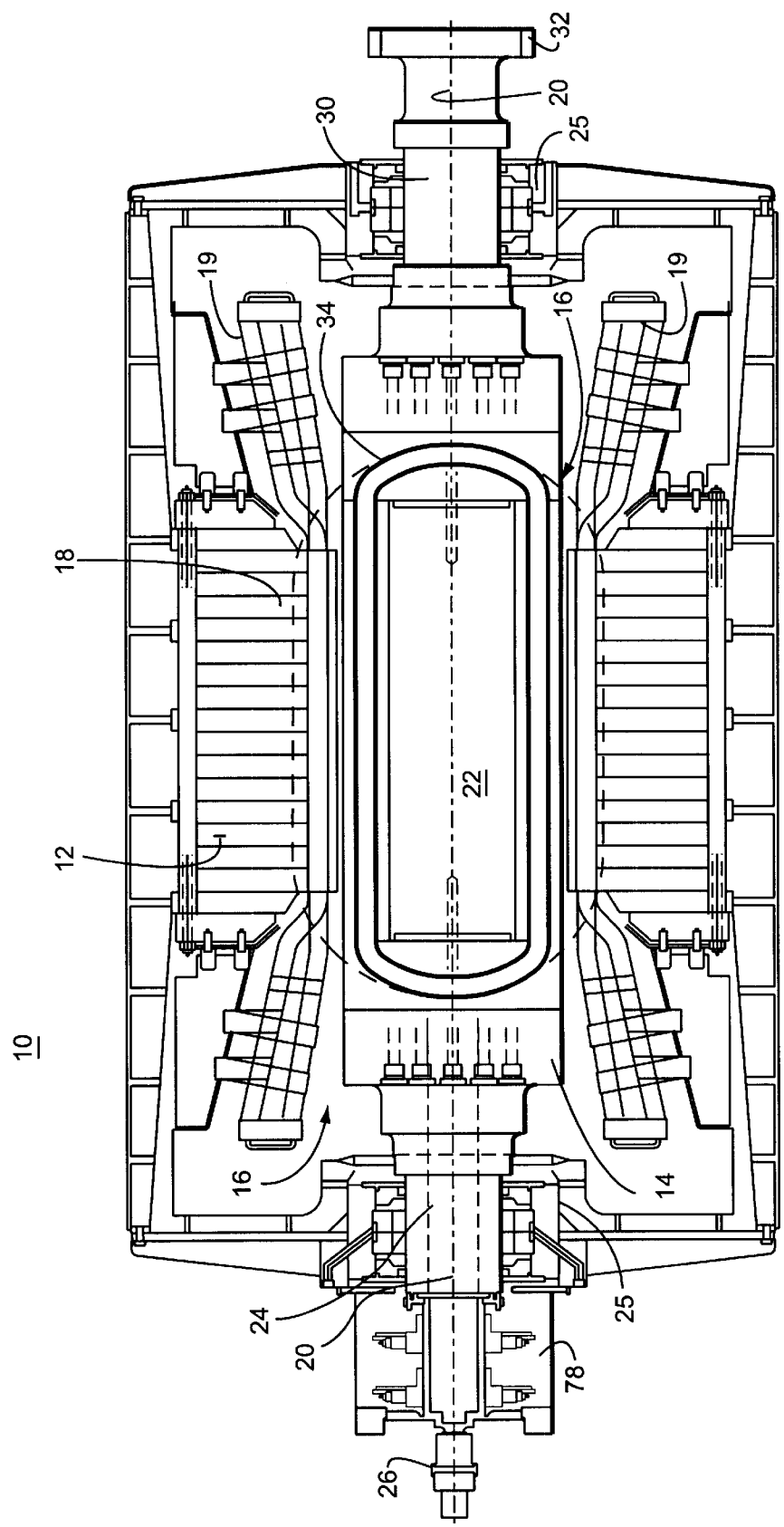
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical cavity 16 of the stator. The rotor fits inside the cavity 16 of the stator. As the rotor turns within the stator, a magnetic field 18 turns through the stator. The magnetic field lines are in a plane perpendicular to the section of FIG. 1 (and can therefore not be shown in FIG. 1), generated by the rotor and rotor coils moves and rotates through the stator, and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force, and, thus, minimize the amount of super-conducting (SC) wire needed for the coil winding. For example, the solid iron rotor core may be magnetically saturated at an air-gap magnetic field strength of about 2 Tesla.

Figure 2:
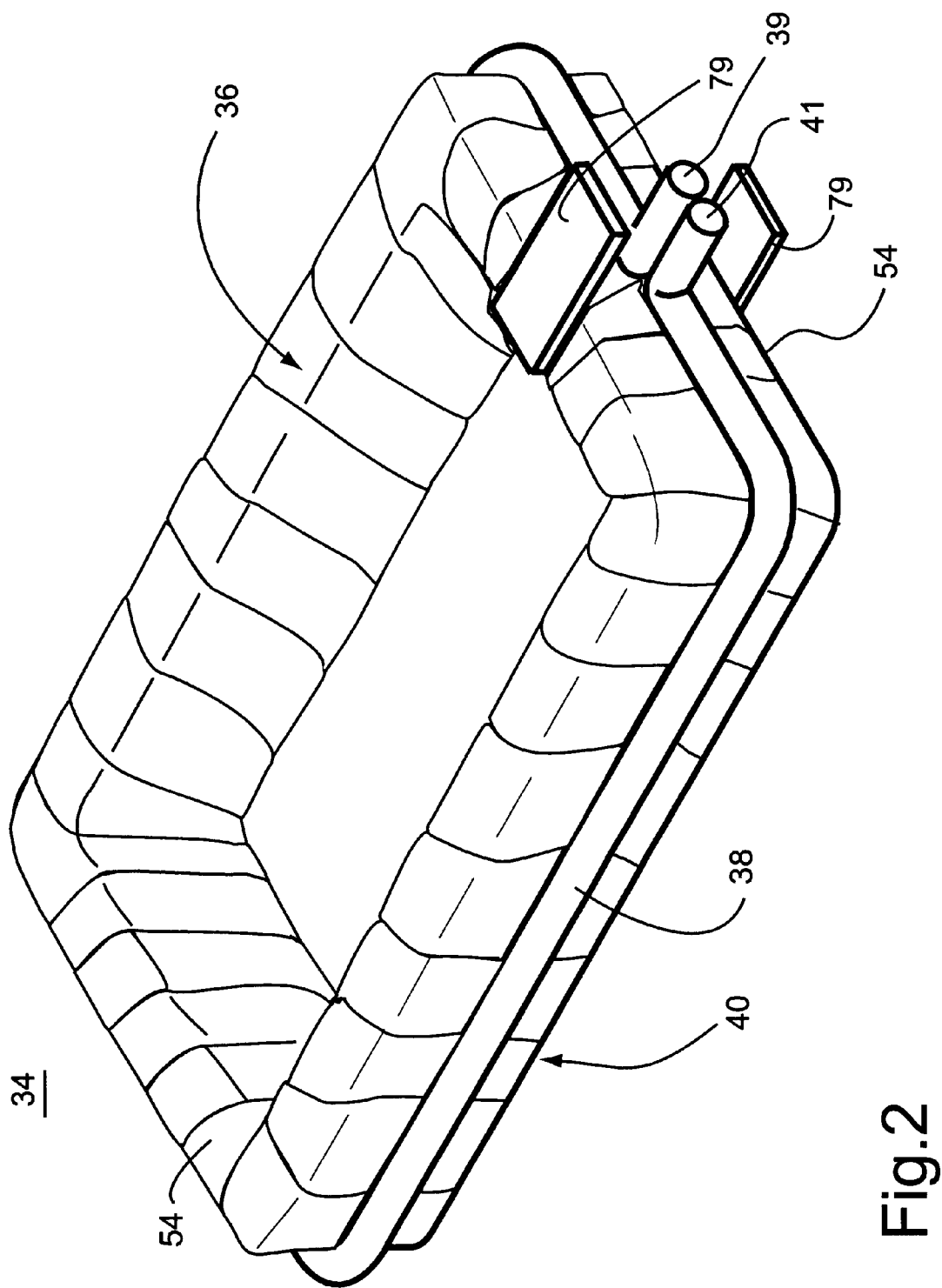
FIG. 2 is a perspective view of an exemplary racetrack super-conducting coil winding.

The rotor 14 supports at least one longitudinally-extending, race-track shaped, high-temperature super-conducting (HTS) coil winding 34 (see FIG. 2). The HTS coil winding may be alternatively a saddle-shape or have some other shape that is suitable for a particular HTS rotor design. A coil support system is disclosed here for a race-track SC coil winding. The coil support system may be adapted for coil configurations other than a racetrack coil mounted on a solid rotor core.

The rotor includes a collector end shaft 24, and a drive end shaft 30. These end shafts are attached to and support the rotor core, and are themselves supported by bearings 25. The collector end shaft may include collector rings 78 to provide an external electrical connection to the SC rotor coils. The collector end shaft 24 also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The opposite end shaft 30 of the rotor may be driven by a power turbine coupling 32. For illustrative purposes FIG. 1 shows an end shaft on the collector side that is not sized for full torque transfer, which is representative of a power train configuration where the generator is driven by turbines from only one shaft end. However, the concepts disclosed within are equally applicable to generators mounted between two turbines where both generator end shafts transmit a large torque.

FIG. 2 shows an exemplary HTS racetrack field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the racetrack SC coil 36. However, the SC pancake coil may also be composed by several pancake coils.

The dimensions of the racetrack coil are dependent on the dimensions of the rotor core. Generally, each racetrack SC coil encircles the magnetic poles of the rotor core, and is parallel to the rotor axis. The coil windings are continuous around the racetrack. The SC coils form a resistance free electrical current path around the rotor core and between the magnetic poles of the core. The coil has electrical contacts 79 that electrically connect the coil to the collector rings 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K, in the SC coil winding needed to promote superconducting conditions, including the absence of electrical resistance in the coil. The cooling passages have an input fluid port 39 and an outlet fluid port 41. These fluid (gas) ports connect the cooling passages 38 on the SC coil to the cryogen transfer coupling 28.

Each HTS racetrack coil winding 34 has a pair of generally straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
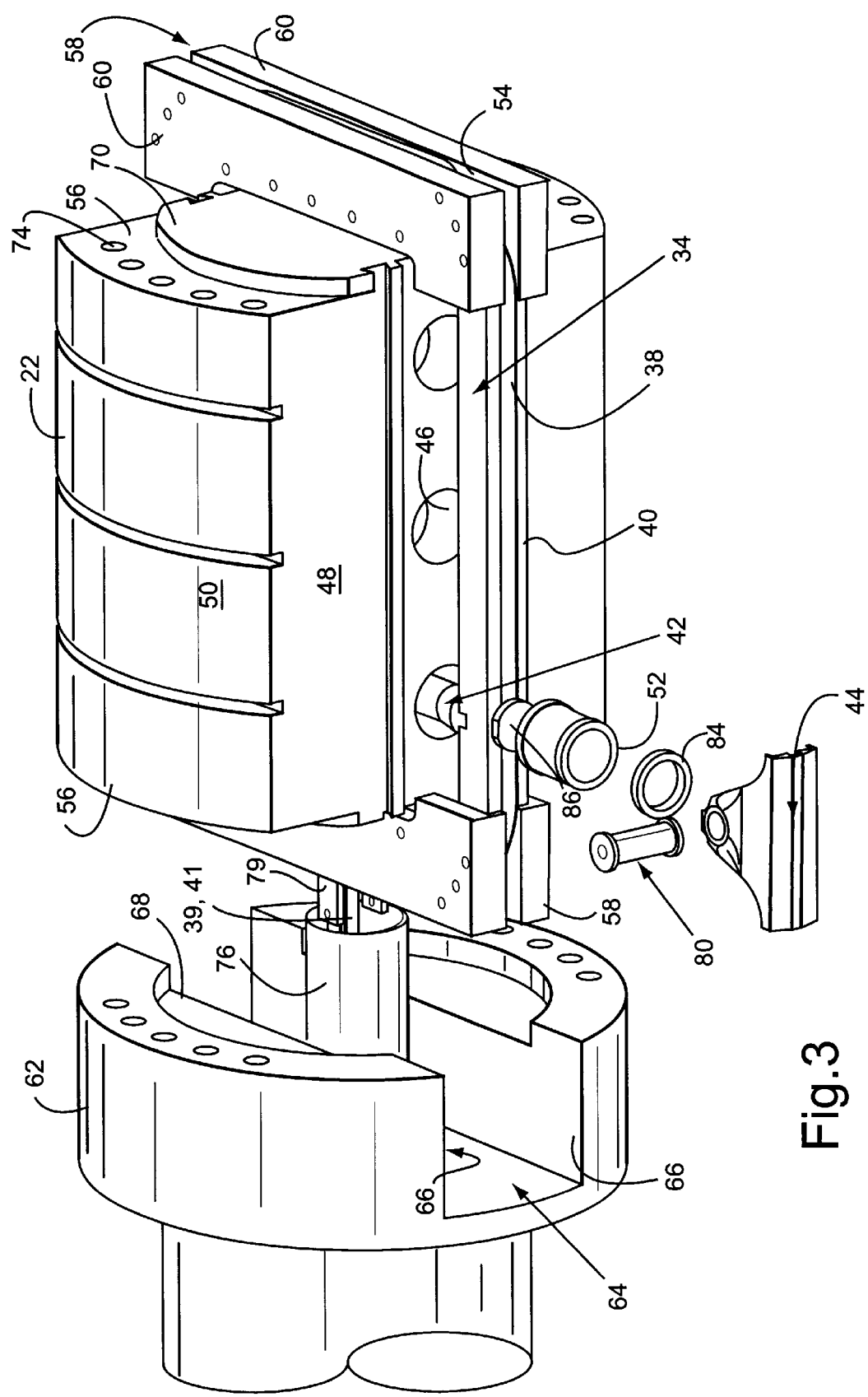
FIG. 3 is an exploded view of the components of a high temperature super-conducting (HTS) rotor with iron core.

FIG. 3 shows partially cut-away view of a rotor core 22 and coil support system for a high temperature superconducting coil. The support system includes tension rods 42 connected to coil housings 44. The housings hold and support the side portions 40 of the coil winding 34 in the rotor. While one tension rod and coil housing is shown in FIG. 3, the coil support system will generally include a series of tension rods that each have coil support housings at both ends of the rod. Moreover, FIG. 3 shows for illustrative purposes the end of the tension rod extending beyond the coil. In practical application, the end of the tension rod would abut a surface of the coil facing the core. The tension rods and coil housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of the coil, the tension rods 42 span between the sections of the coil and attach to the coil housings 44 that grasp opposite side sections of the coil. The tension rods extend through conduits 46, e.g., apertures, in the rotor core so that the rods may span between side sections of the same coil or between adjacent coils.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate an insulating tube 52. This tube aligns the rod 42 in the conduit and provides thermal isolation between the rotor core and the tension rod.

The number of conduits 46 and their location on the rotor core depends on the location of the HTS coils and the number of coil housings needed to support the side sections of the coils. The axes of the conduits 46 are generally in a plane defined by the racetrack coil. In addition, the axes of the conduits are perpendicular to the side sections of the coil. Moreover, the conduits are orthogonal to and intersect the rotor axis, in the embodiment shown here.

The exemplary coil support system disclosed here is a cold support in that the tension rods 42 and associated channel housings 44 are maintained at or near a cryogenic temperature. Because the coil support members are cold, these members are thermally isolated, e.g., by the insulating tubes, 52, from the rotor core and other "hot" components of the rotor.

The rotor core is at an ambient "hot" temperature. The coil supports are potential sources of thermal conduction that would allow heat to reach the HTS coils from the rotor core. The rotor core becomes hot during operation. As the coil windings are to be held in super-cooled conditions, heat conduction into the coils from core is to be avoided.

The coil support system is thermally isolated from the rotor core. For example, the tension rods and bolts are not in direct contact with the rotor. This lack of contact avoids the conduction of heat from the rotor to the tension rods and coils. In addition, the mass of the coil support system structure has been minimized to reduce the thermal conduction through the support assemblies into the coil windings from the rotor core.

Each tension rod 42 is a shaft with continuity along the longitudinal direction of the rod and in the plane of the racetrack coil. The tension rod is typically made of high strength non-magnetic alloys such as titanium, aluminum or an Inconel alloy. The longitudinal continuity of the tension rods provides lateral stiffness to the coils which provides rotor dynamics benefits. Moreover, the lateral stiffness of the tension rods 42 permits integrating the coil support with the coils so that the coil can be assembled with the coil support on the rotor core prior to final rotor assembly.

The flat surface 86 of the end of the tension rod supports an inside surface of a side of the coil winding. The coil housings 44 collectively distribute the forces that act on the coil, e.g., centrifugal forces, over substantially the entire side sections 40 of each coil.

The plurality of coil housings 44 effectively hold the coil in place without affectation by centrifugal forces. Although the coil housings are shown as having a close proximity to one another, the housings need only be as close as necessary to prevent degradation of the coil caused by high bending and tensile strains during centrifugal loading, torque transmission, and transient fault conditions.

The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the coil housing and tension rods.

The U-shaped coil housings 44 are formed of a light, high strength material that is ductile at cryogenic temperatures. Typical materials for coil housing are aluminum, Inconel, or titanium alloys, which are non-magnetic. The shape of the U-shaped housing may be optimized for low weight and high strength.

A dowel pin 80 extends through apertures in the coil housing and tension rod. The dowel may be hollow for low weight. Locking nuts (not shown) are threaded or attached at the ends of the dowel pin to secure the U-shaped housing and prevent the sides of the housing from spreading apart under load. The dowel pin can be made of high strength Inconel or titanium alloys. The flat ends 86 of the tension rods abut the inside surface of the HTS coils, when the rod, coil and housing are assembled together. This assembly reduces the stress concentration at the hole in the tension rod that receives the dowel.

The rotor core 22 is typically made of magnetic material such as iron, while the rotor end shafts are typically made of non-magnetic material such as stainless steel. The rotor core and end shafts are typically discrete components that are assembled and securely joined together by either bolting or welding.

The iron rotor core 22 has a generally cylindrical shape suitable for rotation within the rotor cavity 16 of the stator 12. To receive the coil winding, the rotor core has recessed surfaces 48, such as flat or triangular regions or slots. These surfaces 48 are formed in the curved surface of the cylindrical core and extend longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer-surface of the coil winding extends to substantially an envelope defined by the rotation of the rotor. The outer curved surfaces 50 of the rotor core when rotated define a cylindrical envelope. This rotation envelope of the rotor has substantially the same diameter as the stator cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels 59 (FIG. 10) to receive the coil winding 34 and connections 39, 41 and 79 to the winding. The channels 59 form an opening in the side of the plates 60 which is adjacent an end of a thin walled tube 76 that extends through the collector end shaft. The cooling fluid passages and electrical contacts between the collector rings 78 and coil contacts 79 extend through the tube 76.

The split clamp 58 may be formed of a non-magnetic material, such as aluminum or Inconel alloys. The same or similar non-magnetic materials may be used to form the tension rods, coil housings and other portions of the coil support system. The coil support system is preferably non-magnetic so as to preserve ductility at cryogenic temperatures, since ferromagnetic materials become brittle at temperatures below the Curie transition temperature and cannot be used as load carrying structures.

The split clamp 58 is surrounded by a collar 62 of the end shafts. However, the split clamp and coil are not in physical contact with collar 62. There is a collar 62 at each end of the rotor core 22, although only one collar is shown in FIG. 3. The collar is a thick disk of non-magnetic material, such as stainless steel, the same as or similar to the material, that forms the rotor shafts. Indeed, the collar is part of the rotor shaft. The collar has a slot 64 orthogonal to the rotor axis and sufficiently wide to receive and clear the split clamp 58. The hot sidewalls 66 of the slot collar are spaced apart by a gap from the cold split clamp so they do not come in contact with each other. The gap between the slot 66 sidewalls and the clamp 58 and ends 54 of the coil is maintained in a vacuum. Thus, the vacuum gap between the rotor collar and the split clamp is an insulator that prevents heat transfer between the collar, and the split clamp and SC coil.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region on the end 56 of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts 75 extend through these longitudinal bolt holes 72, 74 and secure the collars to the rotor core.

Figure 4:
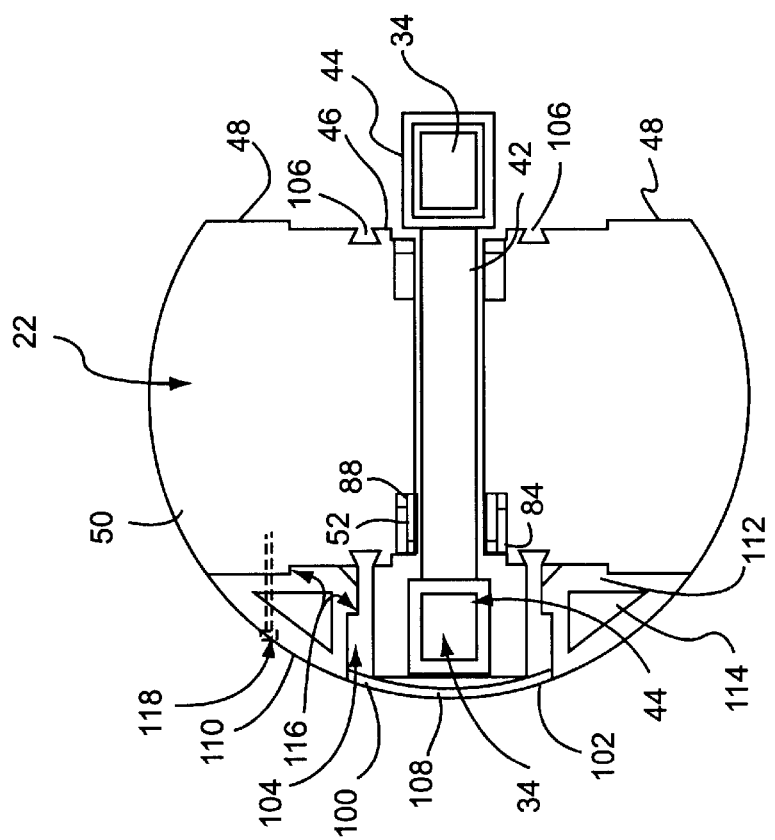
FIG. 4 is a schematic diagram of a rotor cross section showing a first embodiment of a vacuum channel and EM shield.

FIG. 4 is a first cross-sectional schematic view of the rotor core, coil support and coil. In addition, the figure shows a first embodiment of a cross-section of a vacuum housing 100 and an electromagnetic (EM) shield 102. The vacuum housing is a channel that fits over the long side 40 of the coil winding and extends the length of the rotor. The vacuum housing may be formed of a non-magnetic metal, such as stainless steel. Each long side section 40 of the coil 34 has a vacuum channel housing 100 to form an insulating vacuum over that portion of the coil.

The housing 100 has a pair of side-walls 104 that each have a dove-tail foot that fits into a slot 106 extending the length of the flat surface 48 of the rotor core. There is a slot 106 on either of the coil winding and coil supports. The engagement between the dovetail of the side-walls and the slot 106 on the surface 48 of the rotor core forms an air-tight seal.

In the embodiment shown in FIG. 4, an EM shield 102 is formed over the vacuum vessel, coil and coil support structure. The shield is conductive and may be formed of aluminum, which also provides structural support. The shield forms an arc extending from one side of the flat surface 48 on the rotor core to the opposite side of the flat surface. The arc of the shield extends over the vacuum vessel. The top plate 108 of the vacuum vessel has a curved surface and provides a support to the EM shield. Alternatively, the top plate of the vacuum vessel may also form part of the EM shield that attaches to EM shield segments that cover other portions of the rotor.

The EM shield is also supported by triangular braces 110 that fit underneath the EM shield and in a corner formed by the core surface 48 and side-wall of the channel housing. The braces may have ribbing 112 that provide structural support for the EM shield and vacuum channel. In addition, the braces may have an open center region 114 to reduce its mass. The braces are on both sides of the vacuum channel and are spaced along the length of the core. The number of braces is selected to support the shield against the strong forces that may act on the shield.

The sides of the braces that abut the rotor surface 48 and the side-wall 104 of the channel housing may have lips 116 to engage matching lips on the rotor surface and channel side-walls. The engagement between these lips assists in securing the channel housing to the braces and to the slots 106 in the rotor surface. In addition, tension bolts 116 extend through the braces and into the rotor core to attach the brace to the rotor core. The vacuum housing also includes a top plate 108 that is integral with the side-walls and extends over the SC coil 34 and coil supports. The ends of the vacuum channel are open and seal with the slots 66 of the collars 62 at opposite ends of the core 22.

In the embodiment shown in FIG. 4, the braces and EM shield are integral. The EM shield 102 and braces are formed from a single machined aluminum component that fits over the channel housing 100, and is bolted 118 to the rotor surface 48. In an alternative embodiment, the EM shield may be partially formed by the top plate 108 of the vacuum vessel. The EM shield would also include ARC-shaped strips that cover the braces and are on either side of the top plate. The arced surface of the EM shield continues the cylindrical surface formed by the arced surface 50 of the rotor core. The EM shield does not extend over the arced surface 50 of the rotor core. When both EM shields 102 are attached to the rotor core, a complete cylindrical surface is formed by the rotor core and both EM shields. While only one EM shield 102 is shown in FIG. 4, an implementation of the EM shield would likely have shields over both sides 40 of the coil.

The electromagnetic (EM) shield is separated from serving as the vacuum boundary. An internal vacuum boundary, e.g., a channel vacuum housing, is constructed so as to surround the super-conducting coil. At the shaft connection seam, the vacuum housing is sealed using sealing strips to slots in the collar of the end shafts. These slots house the split clamp 58 and end section of the coil housing. EM shield and shield support are assembled adjacent or over the vacuum channel housing. The shield is made of either single or multiple cylindrical sections, which are electrically connected so as to provide EM protection.

Figure 5:
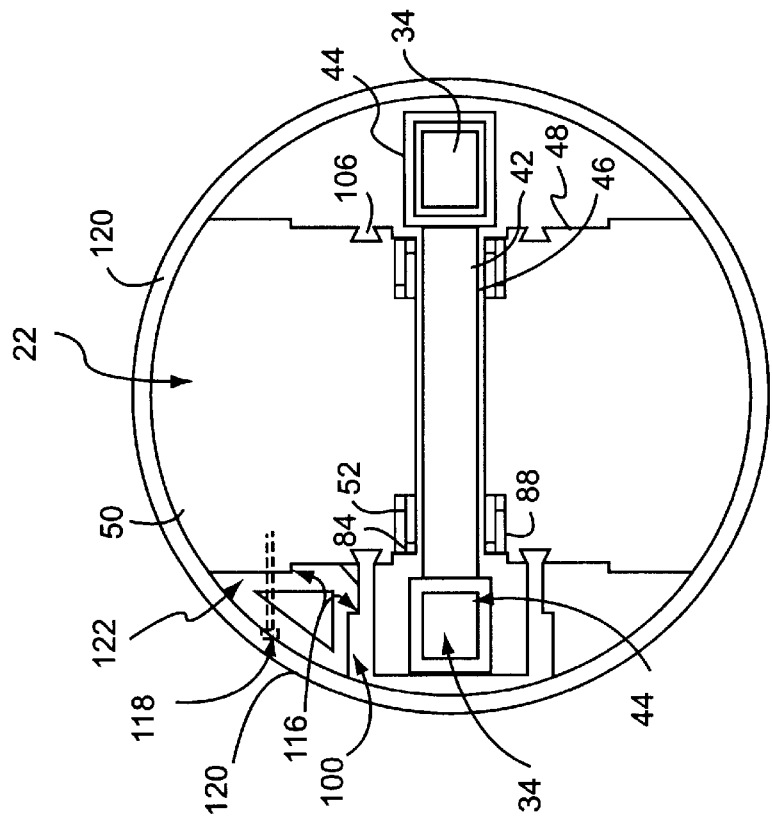
FIG. 5 is a schematic diagram of a rotor cross section showing a second embodiment of a vacuum channel and EM shield.

FIG. 5 shows a second embodiment of the EM shield 120 that is separate from the braces 122. The channel housing 100 shown in FIG. 5 is the same as the housing 100 shown in FIG. 4. In this embodiment, the EM shield 120 is a cylinder that fits over the rotor core, and covers the arced surface 50 and planer surfaces 48 of the core. The braces 122 are individual triangular aluminum pieces that are bolted 118 to the surface 48 of the rotor. The braces secure the channel housing to the slots 106 on the rotor core and support the side-walls 104 of the housing. In addition the braces support the EM shield 120. The number of braces 122 and their spacing along both sides of each vacuum housing is a matter of design choice. The inner braces 122 are mainly for structural support, and can be formed from aluminum or a non-conducting material. The EM shield provides access to the steel forging for balancing through holes in the EM shield 102, and directly to the rotor for the EM shield 120.

FIG. 6 is a schematic diagram of a partially-assembled rotor core 22 and end shaft 24. The dimensions of the rotor core, winding, vacuum housing and other components are exaggerated for illustrative effect in FIG. 6. The rotor core 22 is attached to the collar 62 of the end shafts, such that the coil winding 34 (partially hidden by the vacuum housing 100) fits into the slot 64 (see FIG. 3) of the collar. A seal 124 provides an air-tight junction between the collar and rotor core. The seal 124 is shown in cross section in FIG. 7. The seal ensures that air does not leak between the end of the vacuum channel housing 100 and the collar. The end of the channel housing is sealed to the edges of the collar slot 64 so that a vacuum can be formed around the coil 34 as it extends around the rotor core.

Figure 9:
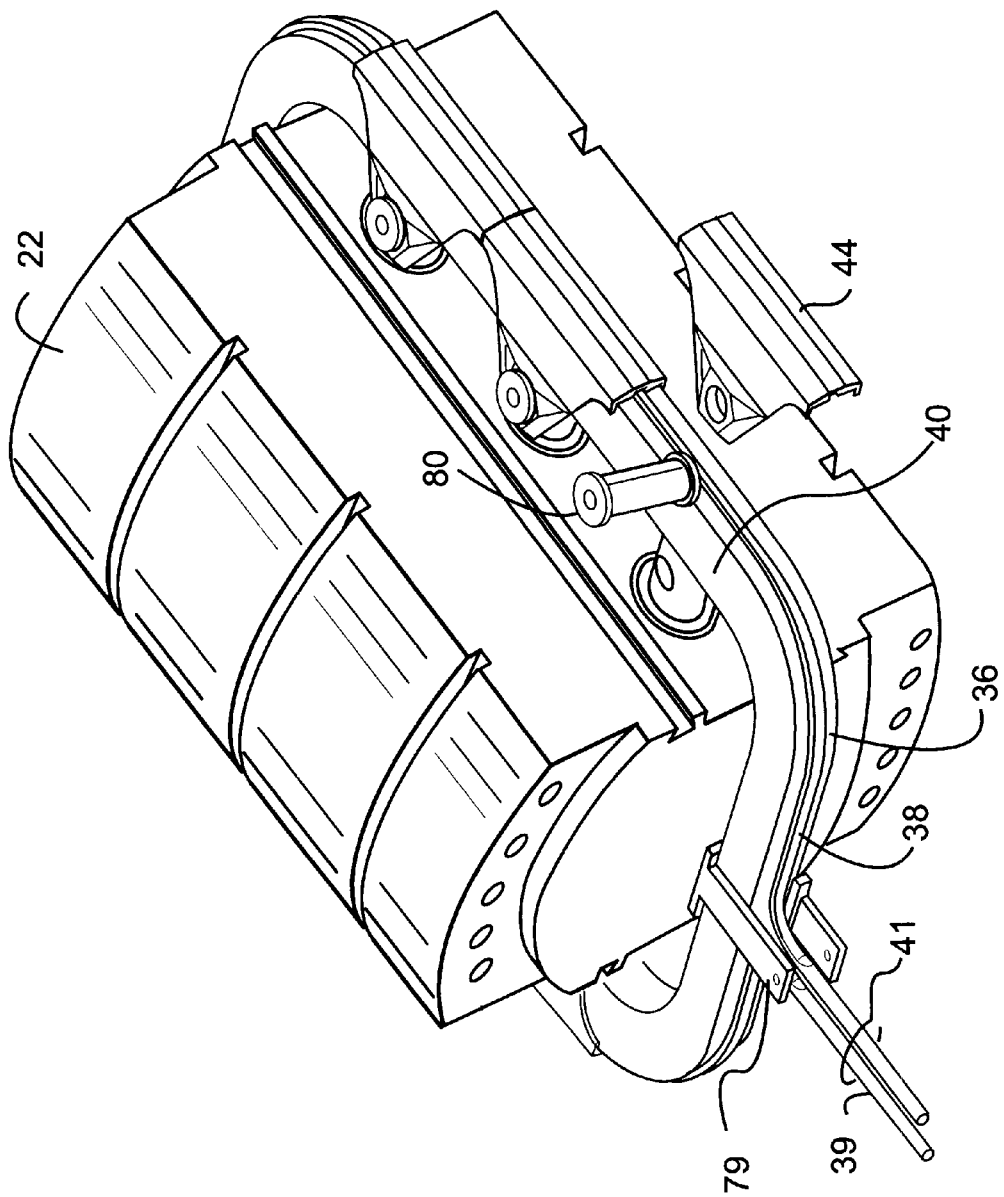

FIGS. 8, 9, 10 and 11 show schematically the assembly process for the coil support structure and coil winding in the rotor. As shown in FIG. 9, before the rotor core is assembled with the rotor end shafts and other components of the rotor, the tension rods 42 are inserted into each of the conduits 46 that extend through the rotor core. The insulator tube 52 at each end of each tension rod is placed in the expanded end 88 at each end of the conduits 46. The tube 52 is locked in place by a retainer locking nut 84. The bolts 43 may be inserted before or after the tension rods are inserted into the rotor core conduits.

As shown in FIG. 9, the SC coil 34 is inserted onto the rotor core such that the flat ends 86 of the tension rods 42 abut the inside surface of the side sections 40 of the SC coil. Once the coil winding has been inserted over the ends of the tension bar, the coil housings 44 are inserted over the SC coil. The coil housings are secured to the ends of the tension bars by inserting dowels 80 through the apertures in the tension rod and coil housing, respectively.

The plurality of coil housings effectively hold the coil in place without affectation by centrifugal forces. Although the coil housings are shown as having a close proximity to one another, the housings need only be as close as necessary to prevent degradation of the coil caused by high bending and tensile strains during centrifugal loading, torque transmission, and transient fault conditions.

The coil housings and tension rods may be assembled with the coil winding before the rotor core and coils are assembled with the collar and other components of the rotor. Accordingly, the rotor core, coil winding and coil support system can be assembled as a unit before assembly of the other components of the rotor and of the synchronous machine.

Figure 10:
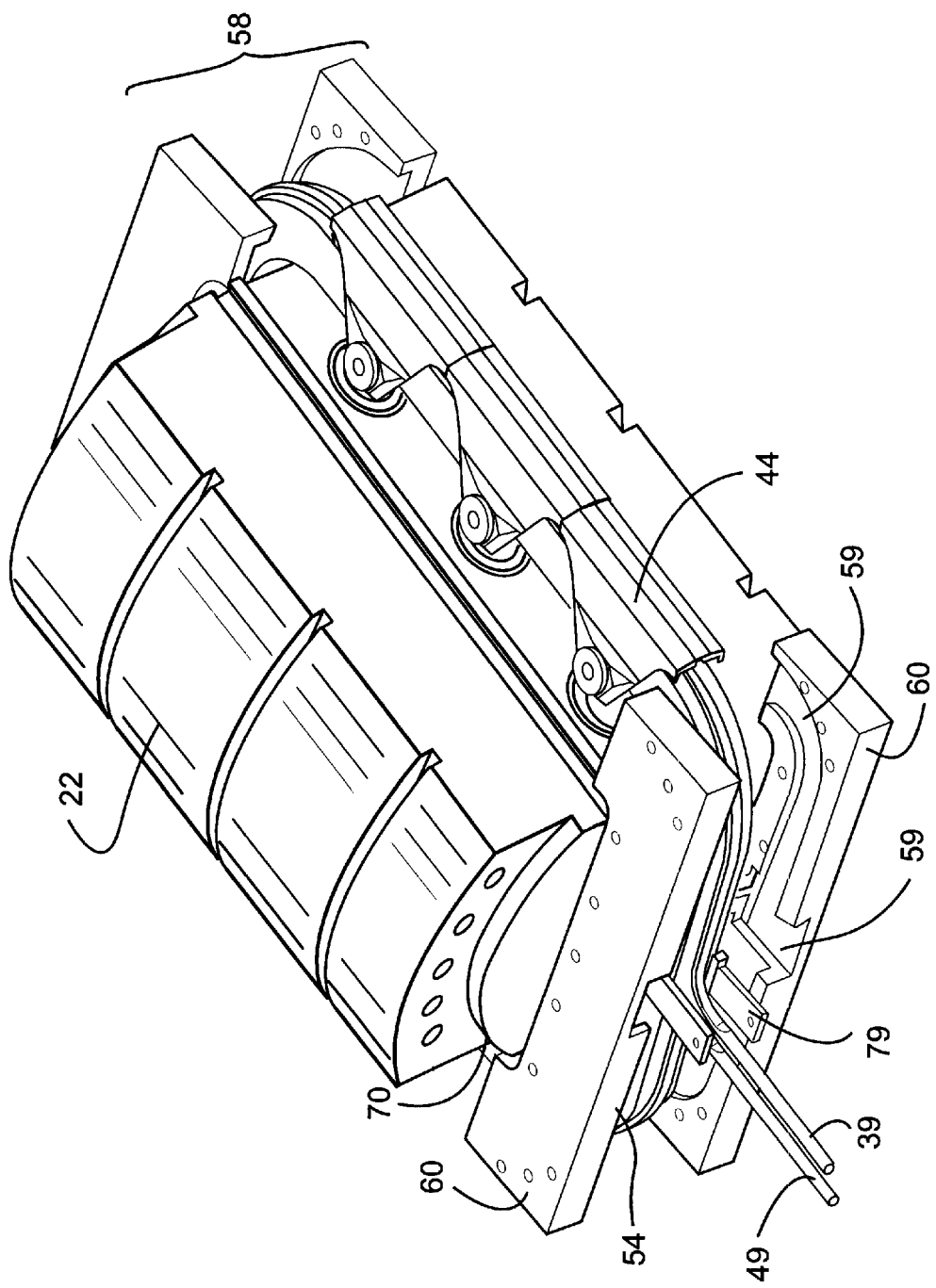

FIG. 10 shows the assembly of the split clamp 58 that is formed by clamp plates 60. The clamp plates 60 sandwiched between them the end sections 54 of the coil winding. The split clamp provides structural support for the ends of the coil winding 34. The plates 60 of the split clamp include on their inside surfaces channels that receive the coil winding. Similarly, the plates include channels 59 for the input/output cooling lines 39, 49 for the gases and for the electrical connections 79 to the coil. These lines and connections extend through tube 76 (FIG. 3) are provided in the collector end shaft 34.

Figure 11:
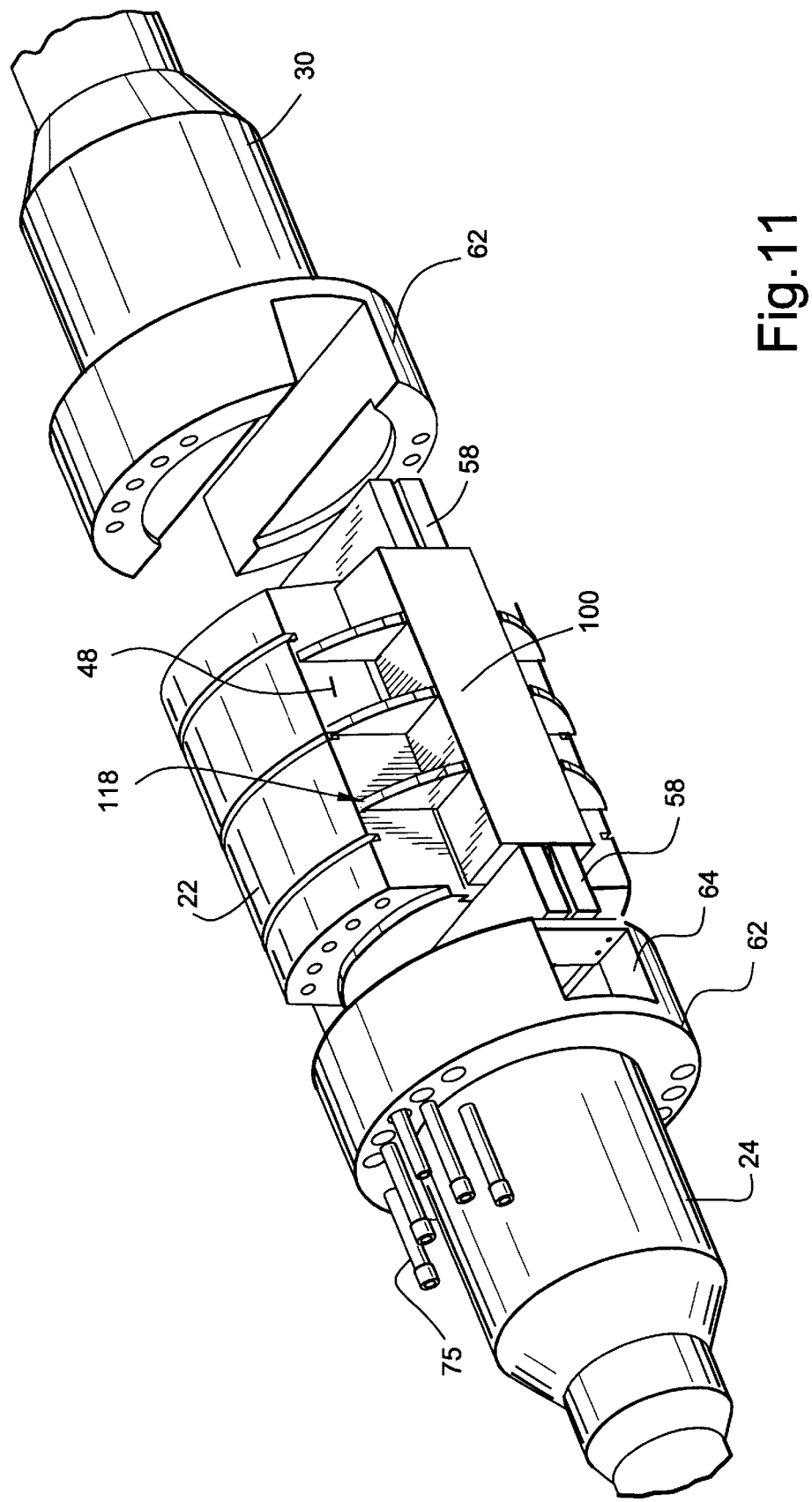

FIG. 11 shows the vacuum channel housing 100 assembled over the side section 40 of the coil. The braces 118 have been placed on both sides of the housing and are bolted to the surface 48 of the rotor core. The collars are bolted 75 to the rotor core such that the ends of the coil and vacuum housing are aligned with the collar slots 64. A seal 124 (see FIG. 6) is placed at the joint between the collar, rotor core and vacuum housing. Once the coil supports, coil, collar and rotor core are assembled, a vacuum can be created around the coil 34 including the side section 40 and end section 56. The vacuum housing is formed by the pair of vacuum channel housings on either side of the core, the slots 64 in the collars 62, and the seal 124 between the collar and ends of the vacuum housings. Once assembled, the rotor is ready to be balanced under cold coil conditions.

In the configuration of FIG. 4, the EM shield does not cover the pole piece 22, and hence provides unrestricted access to the rotor forging for placement of balancing weights. In the configuration of FIG. 5, the EM shield extends around the complete rotor perimeter. Since the EM shield does not perform the function of a vacuum enclosure it can be fabricated with several holes that provide access to the rotor forging 22 for placement of balancing weights. Thus, in both shield concepts of FIGS. 4 and 5, the EM shield provides unrestricted access to the rotor core for balancing purposes. As a result, the rotor can be balanced under cryogenic conditions.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. In a synchronous machine, a rotor comprising:

a rotor core;

a super-conducting coil mounted on said rotor core;

a vacuum housing covering at least one of said coil side sections, and a conductive shield over said vacuum housing and coil side sections.

2. In a rotor as in claim 1 wherein said vacuum housing is a channel housing extending longitudinally along said rotor core.

3. In a rotor as in claim 1 wherein the conductive shield is formed of a copper alloy or aluminum.

4. In a rotor as in claim 1 further comprising a rotor end shaft having a collar and a slot in the collar, wherein the vacuum housing is sealed to the slot and an end section of the coil extends into the slot.

5. In a rotor as in claim 4 further comprising a vacuum around said coil and defined by the vacuum housing and slot in the collar.

6. In a rotor as in claim 1 further comprising a planar surface extending longitudinally across the rotor core, wherein one of said coil side sections is adjacent the planar surface, and said vacuum housing (straddles the one of said side sections, and the side section is sealed to the planer surface.

7. In a rotor as in claim 1 wherein the vacuum vessel is stainless steel, and the shield is a copper alloy.

8. In a rotor as in claim 1 further comprising a plurality of braces buttressing the vacuum housing and conductive shield.

9. A rotor comprising:

a rotor core having an axis;

an end shaft extending axially from an end of said core, wherein said end shaft has a slot adjacent the core end;

a super-conducting rotor coil having at least one coil side parallel to the core axis and at least one coil end transverse to said core axis, wherein said coil end extends through said slot in the end shaft;

a vacuum housing over said coil side and seal with said slot to define a vacuum region around said coil.

10. A rotor as in claim 9 further comprising a conductive shield over said coil side.

11. A rotor as in claim 9 wherein said vacuum housing is a channel straddling said coil side and sealed to said rotor core on both sides of said coil side.

12. A rotor as in claim 11 wherein said vacuum housing comprises side-walls on either side of said coil side, and each side wall is sealed to a surface of the rotor core.

13. A rotor as in claim 12 wherein said surface of the rotor core is slotted to receive said side-walls.

14. A rotor as in claim 12 wherein said surface of said rotor core is planar adjacent said coil side.

15. A rotor as in claim 9 further comprising a plurality of braces adjacent said vacuum housing and attached to said rotor core.

16. A rotor as in claim 15 further comprising an electromagnetic shield (supported by said braces.

17. A rotor comprising:

a rotor core having an axis;

a pair of end shafts extending axially from opposite ends of said core, wherein said end shafts each have a slot adjacent the core end;

a super-conducting rotor coil having at least one coil side section parallel to the core axis and adjacent opposite sides of said core, and said coil having coil end sections transverse to said core axis and adjacent the ends of said core, wherein said coil end sections each extend through one of said slots in the end shafts;

a vacuum housing over each said coil side sections and having ends each being sealed to one of slots, and a vacuum region around said coil defined by said the slot in said pair of end shafts and the vacuum housing over each of said coil side sections.

18. A rotor as in claim 17 further comprising a conductive shield over said coil side sections and overlapping with said end shafts.

19. A rotor as in claim 18 wherein said shield is a cylinder around said core.

20. A rotor as in claim 18 wherein said is formed partially by a top portion said vacuum housing.

21. A rotor as in claim 17 where in said shield is an arced strip extending a length of said core and extending only partially around a circumference of said core.

22. A rotor as in claim 21 wherein said arced strip and a second arced strip each cover one of said coil side sections.

23. A rotor as in claim 18 further comprising braces adjacent said vacuum housing, attached to a surface of said rotor core and supporting said shield.

* * * * *

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13,
Beginning at line 13, replace all claims 1 through 23 with the following:

1. In a synchronous machine, a rotor comprising:

a rotor core;

a super-conducting coil mounted on said rotor core and said coil having at least one coil side section extending along a side of the rotor core and radially outward of the side of the rotor core;

a vacuum housing straddling the at least one coil side section, wherein the vacuum housing further comprises a top plate and a pair of opposite sidewalls such that the at least one coil side section is enclosed on three sides by the vacuum housing, and further the sidewalls are in sealing engagement with the side of the rotor core, and a conductive shield extending over said vacuum housing and coil side sections.

2. In a rotor as in claim 1 wherein said vacuum housing is a channel housing extending longitudinally along side of said rotor core, wherein said side is a planar section of the core and said coil side section and vacuum housing extend radially outward of said planar section.

3. In a rotor as in claim 1 wherein the conductive shield is formed of a copper alloy or aluminum.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

<u>Column 13 (cont'd),</u>

4. In a rotor as in claim 1 further comprising a rotor end shaft having a collar and a slot in the collar, wherein the vacuum housing is sealed to the slot and an end section of coil extends into the slot.

5. In a rotor as in claim 4 further comprising a vacuum around said coil and defined by the vacuum housing and slot in the collar.

6. In a rotor as in claim 1 further comprising a planar surface extending longitudinally across the rotor core, wherein the at least one of coil side section is adjacent the planar surface and extends radially outward of said planar surface.

7. In a rotor as in claim 1 wherein the vacuum vessel is stainless steel, and the shield is a copper alloy.

8. In a rotor as in claim 1 further comprising a plurality of braces buttressing the sidewalls of the vacuum housing and conductive shield.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13 (cont'd),

9. A rotor comprising:

a rotor core having an axis;

an end shaft extending axially from an end of said core, wherein said end shaft has a slot adjacent the core end;

a super-conducting rotor coil having at least one coil side parallel to the core axis and at least one coil end transverse to said core axis, wherein said coil end extends through said slot in the end shaft and said coil side extends radially outward of said rotor core;

a vacuum housing over said coil side and seal with said slot to define a vacuum region around said coil, wherein said vacuum housing has a rectangular cross-section and further comprises a top plate and a pair of opposite sidewalls such that the coil side is enclosed on a plurality of sides by the vacuum housing, and further the sidewalls are in sealing engagement with the rotor core.

10. A rotor as in claim 9 further comprising a conductive shield over said coil side.

11. A rotor as in claim 9 wherein said vacuum housing is sealed to said rotor core on both sides of said coil side.

12. A rotor as in claim 11 wherein each side wall is sealed to surface of the rotor core along an entire length of the rotor core.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13 (cont'd),

13. A rotor as in claim 12 wherein said surface of the rotor core is slotted to receive said side-walls.

14. A rotor as in claim 12 wherein said surface of said rotor core is planar adjacent said oil side.

15. A rotor as in claim 9 further comprising a plurality of braces buttressing said sidewalls of the vacuum housing and attached to said rotor core.

16. A rotor as in claim 15 further comprising an electromagnetic shield around said braces.

17. A rotor comprising:

a rotor core having an axis;

a pair of end shafts extending axially from opposite ends of said core, wherein said end shafts each have a slot adjacent the core end;

a super-conducting rotor coil having at least one coil side section parallel to the core axis and adjacent opposite sides of said core, and said coil having coil end sections transverse to said core axis and adjacent the ends of said core, wherein said coil end sections each extend through one of said slots in the end shafts and said coil side section extends radially outward of said rotor core;

a vacuum housing over each said coil side sections and having ends each being

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13 (cont'd), sealed to one of slots, wherein said vacuum housing further comprises a top plate and a pair of opposite sidewalls such that the coil side is enclosed on a plurality of sides by the vacuum housing, and further the opposite sidewalls are in sealing engagement with rotor core, and a vacuum region around said coil defined by the slot in said pair of end shafts and vacuum housing over each of said coil side sections.

18. A rotor as in claim 17 further comprising a conductive shield over said coil side sections and overlapping with said end shafts, such that the shield is sealed to the end shafts.

19. A rotor as in claim 18 wherein said shield is a cylinder around said core.

20. A rotor as in claim 18 wherein said shield is formed partially by a top portion said vacuum housing.

21. A rotor as in claim 17 where in said shield is an arced strip extending a length of said core and extending only partially around a circumference of said core.

22. A rotor as in claim 21 where in said arced strip and a second arced strip each cover one of said coil side sections.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13 (cont'd),

23. A rotor as in claim 18 further comprising braces adjacent said vacuum housing, attached to a surface of said rotor core and supporting said shield.

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

Column 13,
Beginning at line 13, replace all claims 1 through 23 with the following:

1. In a synchronous machine a rotor comprising:
a rotor core;
a super-conducting coil mounted on said rotor core and said coil having at least one coil side section extending along a side of the rotor core and radially outward of the side of the rotor core;
a vacuum housing straddling the at least one coil side section, wherein the vacuum housing further comprises a top plate and a pair of opposite sidewalls such that the at least one coil side section is enclosed on three sides by the vacuum housing, and further the sidewalls are in sealing engagement with the side of the rotor core, and a conductive shield extending over said vacuum housing and coil side sections.

2. In a rotor as in claim 1 wherein said vacuum housing is a channel housing extending longitudinally along said side of said rotor core, wherein said side is a planar section of the core and said coil side section and vacuum housing extend radially outward of said planar section.

3. In a rotor as in claim 1 wherein the conductive shield is formed of a copper alloy or aluminum.

4. In a rotor as in claim 1 further comprising a rotor end shaft having a collar and a slot in the collar, wherein the vacuum housing is sealed to the slot and an end section of coil extends into the slot.

5. In a rotor as in claim 4 further comprising a vacuum around said coil and defined by the vacuum housing and slot in the collar.

6. In a rotor as in claim 1 further comprising a planar surface extending longitudinally across the rotor core, wherein the at least one of coil side section is adjacent the planar surface and extends radially outward of said planar surface.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

<u>Column 13 cont'd.</u>,
7. In a rotor as in claim 1 wherein the vacuum vessel is stainless steel, and the shield is a copper alloy.

8. In a rotor as in claim 1 further comprising a plurality of braces buttressing the sidewalls of the vacuum housing and conductive shield.

9. A rotor comprising:
a rotor core having an axis;
an end shaft extending axially from an end of said core, wherein said end shaft has a slot adjacent the core end;
a super-conducting rotor coil having at least one coil side parallel to the core axis and at least one coil end transverse to said core axis, wherein said coil end extends through said slot in the end shaft and said coil side extends radially outward of said rotor core;
a vacuum housing over said coil side and seal with said slot to define a vacuum region around said coil, wherein said vacuum housing has a rectangular cross-section and further comprises a top plate and a pair of opposite sidewalls such that the coil side is enclosed on a plurality of sides by the vacuum housing, and further the sidewalls are in sealing engagement with the rotor core.

10. A rotor as in claim 9 further comprising a conductive shield over said coil side.

11. A rotor as in claim 9 wherein said vacuum housing is sealed to said rotor core on both sides of said coil side.

12. A rotor as in claim 11 wherein each side wall is sealed to a surface of the rotor core along an entire length of the rotor core.

13. A rotor as in claim 12 wherein said surface of the rotor core is slotted to receive said side-walls.

14. A rotor as in claim 12 wherein said surface of said rotor core is planar adjacent said oil side.

UNITED STATES PATENT AND TRADEMARK OFFICE
CERTIFICATE OF CORRECTION

| | | |
|---|---|---|
| PATENT NO. | : 6,608,409 B2 | |
| DATED | : August 19, 2003 | |
| INVENTOR(S) | : Wang et al. | |

It is certified that error appears in the above-identified patent and that said Letters Patent is hereby corrected as shown below:

Column 13 cont'd.,
15. A rotor as in claim 9 further comprising a plurality of braces buttressing said sidewalls of the vacuum housing and attached to said rotor core.

16. A rotor as in claim 15 further comprising an electromagnetic shield around said braces.

17. A rotor comprising:
a rotor core having an axis;
a pair of end shafts extending axially from opposite ends of said core, wherein said end shafts each have a slot adjacent the core end;
a super-conducting rotor coil having at least one coil side section parallel to the core axis and adjacent opposite sides of said core, and said coil having coil end sections transverse to said core axis and adjacent the ends of said core, wherein said coil end sections each extend through one of said slots in the end shafts and said coil side section extends radially outward of said rotor core;
a vacuum housing over each said coil side sections and having ends each being sealed to one of slots, wherein said vacuum housing further comprises a top plate and a pair of opposite sidewalls such that the coil side is enclosed on a plurality of sides by the vacuum housing, and further the opposite sidewalls are in sealing engagement with the rotor core, and
a vacuum region around said coil defined by the slot in said pair of end shafts and the vacuum housing over each of said coil side sections.

18. A rotor as in claim 17 further comprising a conductive shield over said coil side sections and overlapping with said end shafts, such that the shield is sealed to the end shafts.

19. A rotor as in claim 18 wherein said shield is a cylinder around said core.

20. A rotor as in claim 18 wherein said shield is formed partially by a top portion said vacuum housing.

21. A rotor as in claim 17 where in said shield is an arced strip extending a length of said core and extending only partially around a circumference of said core.

UNITED STATES PATENT AND TRADEMARK OFFICE
CERTIFICATE OF CORRECTION

PATENT NO. : 6,608,409 B2
DATED : August 19, 2003
INVENTOR(S) : Wang et al.

It is certified that error appears in the above-identified patent and that said Letters Patent is hereby corrected as shown below:

<u>Column 13 cont'd.</u>,
22. A rotor as in claim 21 where in said arced strip and a second arced strip each cover one of said coil side sections.

23. A rotor as in claim 18 further comprising braces adjacent said vacuum housing, attached to a surface of said rotor core and supporting said shield.

This certificate supersedes Certificate of Correction issued June 15, 2004.

Signed and Sealed this

Thirtieth Day of November, 2004

JON W. DUDAS
*Director of the United States Patent and Trademark Office*